Patented Sept. 16, 1924.

1,509,086

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF MAKING BUTTER FROM MILK OIL.

No Drawing. Application filed March 28, 1924. Serial No. 702,568.

*To all whom it may concern:*

Be it known that I, CHARLES E. NORTH, a citizen of the United States of America, residing at Montclair, in the county of Essex and State of New Jersey, have invented certain new and useful Improvements in Processes of Making Butter from Milk Oil, of which the following is a full, clear, and exact description.

For countless ages the production of butter from milk or cream has only and always been successfully accomplished by the use of some mechanical contrivance in the nature of a churn to agitate the cream for the purpose of causing the fat particles to agglomerate. The requirement of churning cream involves for the production of butter on a small scale, as for domestic use, very simple forms of apparatus, but butter making on an extensive commercial scale necessitates the installation of expensive and elaborate equipment for churning in establishments known as centralizers. These are located at central points in cream producing territories and receive cream from numerous small cream gathering stations at more or less frequent intervals which is churned to produce a generally low grade butter known as the tub butter of commerce which constitutes the chief source of butter supply. At all of these centralizers the appliances connected with churning are elaborate and expensive primarily due to the necessity of churning as a process for transforming cream into butter, and these numerous factories and their equipment add greatly to the initial cost of their product.

I have discovered and practiced a wholly new method of making butter in which no form of churn and no churning of the cream is employed. It is simple, efficient and highly economical, capable of readily producing the purest and most desirable grades of strictly sanitary butter and of a nature that permits of all the cream in an immense territory to be made into butter at a single, as distinguished from the present necessity of a large number of factories or centralizers.

In carrying out this invention I do not make butter by the direct churning of cream, but by the utilization in the manner hereinafter set forth of milk oil extracted from cream. Hence I am enabled to dispense with the present system of centralizers or isolated butter factories by converting these into stations for the production or recovery of milk oil, and shipping the pure concentrated and dry milk oil from such stations to a central factory where the oil may be utilized for the production of butter by my novel method which does not involve the use of any form of churn.

This method forms the subject of my present application for Letters Patent, and it may be more readily comprehended from the following considerations:

Circular 136 published by the U. S. Department of Agriculture, defines butter in these terms:

"Butter is the clean non-rancid product made by gathering in any manner the fat of fresh or ripened milk or cream into a mass which also contains a small portion of the other milk constituents, with or without salt, and contains not less than eighty-two and five-tenths per cent (82.5%) of milk fat. By acts of Congress approved August 2, 1886, and May 9, 1902, butter may also contain added coloring matter."

The amount of curd in butter varies from 1% to 2%, and if salt is used, from 1% to 3% so that the quantity of water present varies from 13% to 16%.

The fat globules in milk and cream from which butter is made are of such size and number that when crowded together so that they are in actual contact, as they are in butter, they will occupy 80% of the space within which they are confined, the remaining 20% of the space being accounted for by the spaces between the globules. Since butter contains 82% or more of fat, it is obvious that the globules have been pressed together resulting in a fat concentration greater than when the globules are in spherical form. The adhesion or agglomeration of fat globules in butter means that their surfaces have been brought into contact so that they adhere or stick together, and their normal spherical shape has been lost by a flattening at the point of contact resulting from whatever mechanical force has been used to bring about their adhesion or agglomeration in the process of butter making.

To bring about this result the general and commercial practice for centuries has adopted and used some form of churn. The mechanical action of all churns involves an agitation of the fat globules in suspension in the serum of the milk and cream which forces or knocks them together until they adhere, and the results of such agitation depend not only on the nature of the mechanical force applied, but on the condition of the cream itself. Authorities are agreed that for effective churning, cream should have a fat concentration of not more than 30% to 35% for the reason that higher concentrations make the cream so thick or viscous that uniform agitation is difficult, some of the viscous material remaining stationary and failing to come readily into contact with the agitator. On the other hand, in cream having a fat concentration less than 30% the fat globules are so dispersed by the excess of milk serum that they are not brought readily into contact.

The amount of agitation required to bring the fat globules into a condition of agglomeration, as complete as can be expected of the churning process, under existing conditions obtaining in the art, is that due to from one to two thousand strokes of a paddle or the same number of revolutions of a churn containing sour cream, while for the churning of sweet cream at least 25% additional agitation is required. The time required for churning sour cream ranges from 30 to 40 minutes, and for sweet cream from 40 to 50 minutes.

There is now available on the market a new product known as milk oil consisting of 100% pure milk fat which I utilize in the solution of the problem of butter making in an entirely novel manner. The concentration of fat in this oil being already 100% it is possible to add to it smaller or larger amounts of milk solids not fat and water to produce mixtures resembling cream and containing any concentration of fat desired. I have found, for example, that milk oil melted by temperatures above the melting point of milk fat or 96° F. may, in this melted condition, be mixed in the proportions of 5 parts of oil to 1 part of dried skim milk in any simple mixing device, the oil itself absorbing the powder forming a uniform mixture. If one part of water be then added, a thick paste emulsion will be produced in a few moments by a simple mixing, in which the oil has been transformed into fat globules, the size of which depends upon the extent to which the mixing operation has been carried. For example, on stirring or mixing the mass for one or two minutes, the globules may be found to exceed 25 mu in size. After five minutes of mixing they may be reduced below 10 mu and by further mixing or agitation they may be reduced to 5 mu or less, which is the average size of the fat globules in natural milk and cream.

In such a paste as this containing 5 parts of fat and 2 parts of solids not fat and water the percentage of fat present is approximately 71, but it is possible to increase this percentage so that a complete paste emulsion may be formed containing 8 parts of fat, 1 part dried skim milk and 1 part of water, in which case the fat concentration will be 80%. If the fat globules themselves while still in spherical form actually occupy 80% of the space in which they are confined, then the limit of fat concentration in the emulsion would be 80%, and I have found that in the production of such paste I am able to reach this degree of concentration and still keep the fat globules in an emulsified form.

Milk fat is melted by temperatures above 96° F. in which case the globules are in the form of liquid oil. In making the paste above described, therefore, I keep the temperature, for convenience, between 110° and 140° F. with fat concentration from 60% to 80%, but even at such temperatures the paste is not fluid, but thick and viscous having the consistency of a gum or thick mucilage due to its emulsified condition. It is manifest that while under the microscope the fat globules are in spherical form and in complete emulsion, yet their surfaces are not fully in contact, being held apart by the emulsifying agent which is one factor preventing them sticking together or coalescing, the other being the fact that they are in the condition of melted oil so that their surfaces are not sticky.

Changes of temperature, however, affect the condition of milk fat to a very marked extent, for if cooled to a temperature between 55° and 65° F. the fat changes from a liquid to a semi-solid condition, the globules changing from drops of liquid oil to semi-solid particles of gummy or waxy fat, in which condition their surfaces are very sticky. As a consequence, if their surfaces are brought into contact adherence or coalescence at once takes place, this fact being analogous to that which has been observed in the churning of cream, the temperature of which for the most effective production of butter long experience has found to be from 55° to 65° F.

The paste emulsion in question may be readily cooled in a brief period to a temperature between 55° and 65° F. The fact that the concentration of fat is already so great that the globules, which at this temperature become semi-solid and sticky, are very nearly in contact makes the amount of mechanical force necessary to bring such globules in actual contact extremely slight. For example, I have found that while in this condition a simple pressure or squeezing together of the globules such as would be effected by a wooden paddle or roller or any such means, results in their sudden and complete agglomeration, and the discharge of any excess of butter milk or fluid which occupied the spaces between the globules in the paste emulsion. The amount of this butter milk discharge depends upon the fat concentration, being inversely proportional to the fat concentration.

This agglomeration or adherence of the fat globules is not a slow or gradual process, as occurs in churning, but when the paste is cooled to the right temperature is very rapid and results in the immediate formation of butter. It may be accomplished by the use of any simple mechanical contrivance such as the well known butter workers used in the industry which will press together, or rub or roll or agitate the paste in such manner as to bring the surfaces of the fat globules into contact. The action or operation of such a device should be relatively slow and gentle to secure the best results.

As soon as the excess butter milk has been discharged the butter thus formed may be washed and worked in precisely the same way that ordinary butter is usually treated. It has all the desirable characteristics of churned butter, including what is known as grain. In other words, the fat in the finished product is not a smooth continuous oily substance, but has a texture due to granules or clusters of fat particles. It will be observed that in the paste emulsion described the globules are identical in size and nature with those in normal milk or cream, hence the butter made from them possesses the same properties and characteristics as churned butter.

The flavor of butter made by churning sour cream differs from that made from sweet cream, and by following the process herein described a butter will result having the flavor of sweet cream butter. But if the butter so made be washed with sour milk or sour skim milk the flavor of sour cream churned butter may be imparted to it. It is also possible, during the working process, to work in salt, coloring matter or other flavors if these are needed or desired.

In order to leave no question as to just what my new process of butter making involves, I give a specific example by following the instructions of which any one, in a very small or on a very extended scale, can produce the desired result.

Mix 6 parts of pure milk oil with 1 part of a good dry skim milk powder and stir until thoroughly mixed at a temperature of about 140° F. Then add 1 part of water at the same temperature and stir for five minutes or more until a stiff paste is formed. Cool this paste to a temperature of about 60° F. Squeeze or press or rub the paste until complete agglomeration of the fat takes place and the greater part of the free butter milk is forced out. Then work and wash the product at a proper temperature until the butter acquires a proper consistency and is freed from excess butter milk.

To cool the paste, it may be gently stirred in a vessel surrounded by ice water, and the total time required to produce the finished butter will not exceed ten minutes.

The recovery of butter fat by this process is practically complete, the loss of fat in butter milk as compared with that in the regular commercial process of churning, being very greatly reduced in two ways. First, the fat globules in the paste are so close together and their agglomeration is so easily accomplished by squeezing or pressing the material that practically all of these globules are quickly and completely agglomerated. Second, the quantity of butter milk is but a small fraction of that which is discharged in the ordinary process of churning, for in my process of making butter from a paste having a fat concentration of 70% there is present only 30% butter milk, while in the 33% cream used for churning butter milk is present to the extent of 67%.

From the above the great advantages of this new method of making butter are apparent. Milk oil and skim milk powder are both obtainable now in any amounts at many places and both may be economically produced at points of cheap and abundant supply. These products may be cheaply shipped to centers of densely populated territories and then made by a simple and cheap process in the finest grades of butter. The time required to make butter from the raw materials is very greatly reduced and no expensive or complicated appliances of any description are required.

In the above I have described as the emulsifying agent milk powder, which responds to the general characterization of milk solids not fat. This latter term, however, includes a wide range of equivalents, among which may be mentioned casein in any form, curds, pot-cheese, and dried milk or cream as well as dried skim milk, or even condensed milk, all of which are composed, in part at least, of milk solids not fat.

What I claim as my invention is:

1. The process of making butter from artificial milk or cream emulsions of high fat concentration, which consists in cooling such emulsion to the temperature at which fat has a tendency to agglomerate and then pressing or squeezing the same until the fat coalesces and the excess butter milk is discharged.

2. The process of making butter without churning, which consists in mixing together milk oil, dried milk solids not fat, and water at a temperature above the melting point of the fat and in proportions to form an emulsified paste of high fat concentration, cooling such paste to a temperature at which the fat has a tendency to agglomerate, and then pressing or squeezing the same to produce such agglomeration and the discharge of the excess of butter milk.

3. The process of making butter from milk oil, which consists in forming with such oil, solids not fat and water, an emulsified paste of such high fat concentration that the fat particles are in very close approximation, cooling the paste to the temperature at which such globules have a tendency to agglomerate or stick together, and then pressing or squeezing the same to effect such agglomeration and the discharge of the excess butter milk.

4. The process of making butter from pure concentrated milk oil, which consists in emulsifying the oil to form a cream of such a high fat concentration that the fat particles are in very close approximation, cooling this cream to a temperature at which the fat has a tendency to agglomerate and then pressing or squeezing the same until such fat particles are brought into practically complete agglomeration and butter formed.

5. The process of making butter from milk oil, which consists in forming with such oil at a temperature above the melting point of fat a concentrated paste emulsion having a fat percentage from 50% to 80%, cooling such paste to a temperature of at least 65° F. and agglomerating the fat particles in a solid mass by the application of a pressure which brings them into actual contact.

6. The process of making butter from milk oil without churning, which consists in making with such oil at a temperature above 96° F. an emulsified paste of high fat concentration, cooling such paste to 65° F. or lower and while at such temperature bringing the fat particles into actual contact by the application thereto of pressure until their practically complete agglomeration is effected.

7. The process herein set forth of making butter without churning, which consists in forming with milk oil an emulsified paste of high fat concentration, cooling the paste and causing the agglomeration of the fat particles by pressure theron, washing and working the agglomerated fat with the desired flavoring or coloring matter in the manner common in the making of ordinary butter.

In testimony whereof I hereunto affix my signature.

CHARLES E. NORTH.